(12) United States Patent
Wang et al.

(10) Patent No.: US 10,146,596 B2
(45) Date of Patent: Dec. 4, 2018

(54) METHOD AND APPARATUS FOR DATA INPUT SUPPORTING

(71) Applicant: Shenzhen Skyworth-RGB Electronics Co. Ltd., Shenzhen, Guangdong Prov. (CN)

(72) Inventors: Zhi-Guo Wang, Shenzhen (CN); Yong-Bin Chen, Shenzhen (CN); Xia Tan, Shenzhen (CN); Chong-Yan Xu, Shenzhen (CN); Hao Li, Shenzhen (CN)

(73) Assignee: SHENZHEN SKYWORTH-RGB ELECTRONICS CO., LTD., Shenzhen (CN)

(*) Notice: Subject to any disclaimer, the term of this patent is extended or adjusted under 35 U.S.C. 154(b) by 1185 days.

(21) Appl. No.: 13/844,884

(22) Filed: Mar. 16, 2013

(65) Prior Publication Data
US 2014/0059568 A1  Feb. 27, 2014

(30) Foreign Application Priority Data
Aug. 24, 2012 (CN) .......................... 2012 1 0305231

(51) Int. Cl.
*H04L 12/58* (2006.01)
*G06F 9/54* (2006.01)

(52) U.S. Cl.
CPC .............. *G06F 9/541* (2013.01); *G06F 9/542* (2013.01); *G06F 2209/545* (2013.01)

(58) Field of Classification Search
None
See application file for complete search history.

(56) References Cited

U.S. PATENT DOCUMENTS

| 8,402,498 B2* | 3/2013 | George et al. | 725/106 |
| 2002/0069245 A1* | 6/2002 | Kim | 709/203 |

(Continued)

OTHER PUBLICATIONS

Xiaoyi Chen et al. "Smartphone Virtualization: Status and Challenges" (Year: 2011).*

(Continued)

*Primary Examiner* — Lechi Truong
*Assistant Examiner* — Abdou K Seye
(74) *Attorney, Agent, or Firm* — Tim Tingkang Xia, Esq.; Locke Lord LLP

(57) ABSTRACT

Data input supporting method and apparatus are disclosed. The data input supporting method includes receiving virtual data sent by an intelligent mobile device, analyzing the received virtual data according to a pre-stored key value mapping file, the key value mapping file saving a mapping relationship between the virtual data and a real instruction, encapsulating the real instruction obtained by analyzing the virtual data, and sending the encapsulated real instruction to a pre-established virtual device node, filling the real instruction into a corresponding system function by the virtual device node automatically according to an instruction type; and responding to a kernel space data injection event generated by filling the real instruction into the system function. Embodiments of the invention can support non-contact control of the intelligent mobile device to an electronic product through a wireless connection, thereby providing desirable user experience.

12 Claims, 6 Drawing Sheets

(56) References Cited

U.S. PATENT DOCUMENTS

2004/0259537 A1* 12/2004 Ackley .................. 455/420
2006/0265718 A1* 11/2006 Tsang et al. ............ 719/321
2009/0077467 A1* 3/2009 Adappa et al. ......... 715/719
2013/0103815 A1* 4/2013 Ardiri et al. ........... 709/223

OTHER PUBLICATIONS

Yongfeng Yin et al. "Research on Automatic Testing Technology Oriented Intelligent Mobile Terminal Software" (Year: 2010).*

* cited by examiner

METHOD AND APPARATUS FOR DATA INPUT SUPPORTING

CROSS-REFERENCE TO RELATED APPLICATION

This application claims the priority to Chinese Patent Application No. 201210305231.4, filed in the State Intellectual Property Office of P.R. China, on Aug. 24, 2012, which is hereby incorporated herein in its entirety by reference.

FIELD OF THE INVENTION

The present invention relates generally to consumer electronics, and more particularly to method and apparatus for data input supporting.

BACKGROUND OF THE INVENTION

Currently, with the advent of the era of intelligent electronic products, human-machine interaction not only rests on interaction between a remote control and an electronic product, since in this manner, very little content can be input and the interaction is also limited by directions. Further, the interaction is quite inconvenient.

In order to solve the problems, an existing method is interconnecting an intelligent mobile device with an electronic product through a wireless technology, so as to control the electronic product by clicking on an interface of the intelligent mobile device. The existing method is implemented by direct interaction between the intelligent mobile device and the electronic product. However, it is difficult to identify different operation instructions of the same platform or identify the same operation instruction of different platforms, and thus, the method has poor extensibility and compatibility, and has poor user experience.

Therefore, a heretofore unaddressed need exists in the art to address the aforementioned deficiencies and inadequacies.

SUMMARY OF THE INVENTION

On aspect of the present invention provides a data input supporting method, so as to solve the problems of having poor extensibility and compatibility and having poor user experience caused by the existing method.

In one embodiment, the data input supporting method includes the steps of receiving virtual data sent by an intelligent mobile device; analyzing the received virtual data according to a pre-stored key value mapping file, the key value mapping file saving a mapping relationship between the virtual data and a real instruction; encapsulating the real instruction obtained by analyzing the virtual data, and sending the encapsulated real instruction to a pre-established virtual device node; filling the real instruction into a corresponding system function by the virtual device node automatically according to an instruction type; and responding to a kernel space data injection event generated by filling the real instruction into the system function.

Another aspect of the present invention provides a data input supporting apparatus.

In one embodiment, the apparatus includes a virtual data receiving unit adapted for receiving virtual data sent by an intelligent mobile device; a virtual data analyzing unit adapted for analyzing the received virtual data according to a pre-stored key value mapping file, the key value mapping file saving a mapping relationship between the virtual data and a real instruction; a virtual data sending unit adapted for encapsulating the real instruction obtained by analyzing the virtual data, and sending the encapsulated real instruction to a pre-established virtual device node; a virtual data filling unit adapted for filling the real instruction in a corresponding system function automatically according to an instruction type; an instruction responding unit adapted for responding to a kernel space data injection event generated by filling the real instruction into the system function.

In yet another aspect, the present invention relates to a non-transitory tangible computer-readable medium storing instructions which, when executed by one or more processors, cause the above apparatus to perform the data input supporting method.

According to the present invention, by means of the established virtual device node, a system of an electronic product can identify virtual data corresponding to different operation instructions of the same platform or virtual data corresponding to the same operation instruction of different platforms, where the virtual data is sent by the intelligent mobile device, thereby improving the compatibility and extensibility of the system. Therefore, the embodiments of the present invention can perfectly support non-contact control of the intelligent mobile device to the electronic product through a wireless connection, thereby providing desirable user experience.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION OF THE INVENTION

Figure 1:
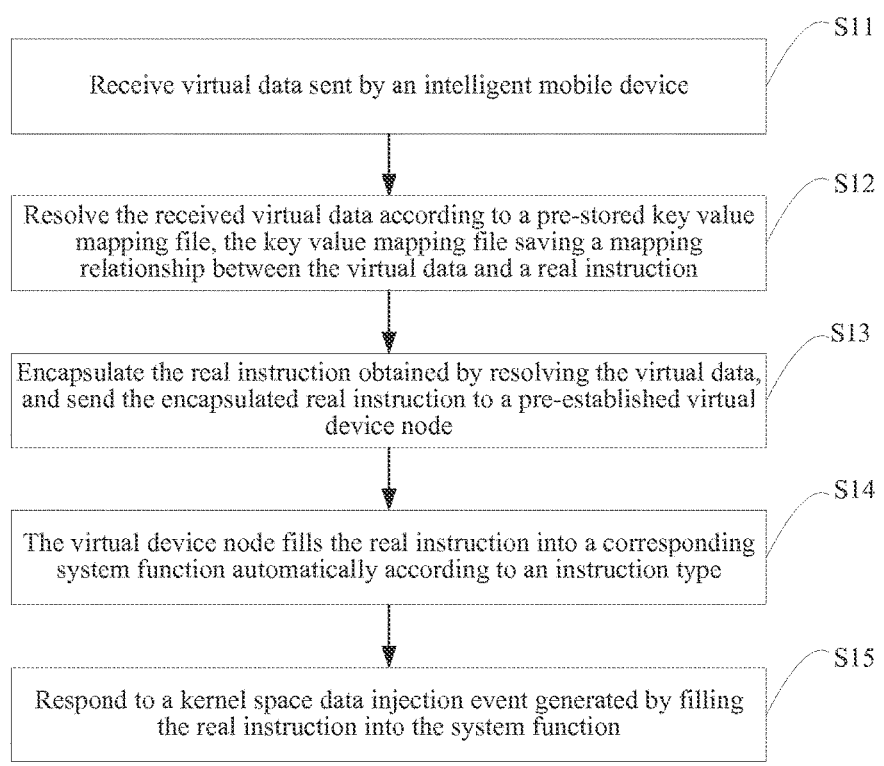
FIG. 1 is a flow chart of a data input supporting method according to one embodiment of the present invention.

The present disclosure will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The description will be made as to the embodiments of the present disclosure in conjunction with the accompanying drawings in FIGS. 1-6. It should be understood that specific embodiments described herein are merely used for explaining the present invention, but are not intended to limit the present invention. In accordance with the purposes of this disclosure, as embodied and broadly described herein, this invention, in one aspect, relates to a data input supporting method, and an apparatus of implementing the same.

In one embodiment, the data input supporting method includes the steps of receiving virtual data sent by an intelligent mobile device; analyzing the received virtual data according to a pre-stored key value mapping file, the key value mapping file saving a mapping relationship between the virtual data and a real instruction; encapsulating the real instruction obtained by analyzing the virtual data, and sending the encapsulated real instruction to a pre-established virtual device node; filling the real instruction into a corresponding system function by the virtual device node automatically according to an instruction type; and responding to a kernel space data injection event generated by filling the real instruction into the system function.

In one embodiment, the data input supporting apparatus includes a virtual data receiving unit adapted for receiving virtual data sent by an intelligent mobile device; a virtual data analyzing unit adapted for analyzing the received virtual data according to a pre-stored key value mapping file, the key value mapping file saving a mapping relationship between the virtual data and a real instruction; a virtual data sending unit adapted for encapsulating the real instruction obtained by analyzing the virtual data, and sending the encapsulated real instruction to a pre-established virtual device node; a virtual data filling unit adapted for filling the real instruction in a corresponding system function automatically according to an instruction type; an instruction responding unit adapted for responding to a kernel space data injection event generated by filling the real instruction into the system function.

According to the present invention, a virtual device node is established in a system of an electronic device, the virtual device node, serving as a bridge between an intelligent mobile device and the electronic product (i.e., the electronic device), is used for receiving virtual data being analyzed by the system of the electronic product, and injecting a real instruction obtained by analyzing the virtual data into the system of the electronic product, so that the system of the electronic product can respond to the injected real instruction correctly. As used herein the application, the terms "electronic device" and "electronic product" are exchangeable.

Without intent to limit the scope of the invention, further exemplary processes and their related results according to the embodiments of the present invention are given below.

Embodiment 1

FIG. 1 is a flow chart of a first data input supporting method according to Embodiment 1 of the present invention. The method specifically includes the following steps.

At Step S11: virtual data sent by an intelligent mobile device is received.

In this embodiment, when the intelligent mobile device intends to control the electronic product, the intelligent mobile device can find the electronic product through a WiFi local area network or a Bluetooth® device. After the intelligent mobile device establishes a connection with the electronic product, enter an operation interface of the intelligent mobile device, and click a control button to send a corresponding control instruction to the electronic product. The system of the electronic product receives virtual data sent by the intelligent mobile device. The virtual data in this embodiment is not a real instruction, but protocol data. The system of the electronic product may be an android system based on a Linux core.

At Step S12: the received virtual data is analyzed according to a pre-stored key value mapping file, the key value mapping file saving a mapping relationship between the virtual data and a real instruction.

In this embodiment, in order to facilitate extension of different operation instructions of the same platform or extension of the same operation instruction of different platforms, it is required to pre-store a key value mapping file, and the key value mapping file stores the mapping relationship between the virtual data and a real instruction. The system of the electronic product resolves the virtual data sent by the intelligent mobile device with reference to a key value mapping relationship in the key value mapping file, so as to obtain the real instruction corresponding to the virtual data.

At Step S13: the real instruction obtained by analyzing the virtual data is encapsulated, and the encapsulated real instruction is sent to a pre-established virtual device node.

In this embodiment, the system encapsulates the real instruction obtained by analyzing the virtual data, and sends the encapsulated real instruction to the pre-established virtual device node in an ioctl manner. The ioctl is a function of performing management on an I/O channel of the device in a device driver.

At Step S14: the virtual device node fills the real instruction into a corresponding system function automatically according to an instruction type.

Figure 2:
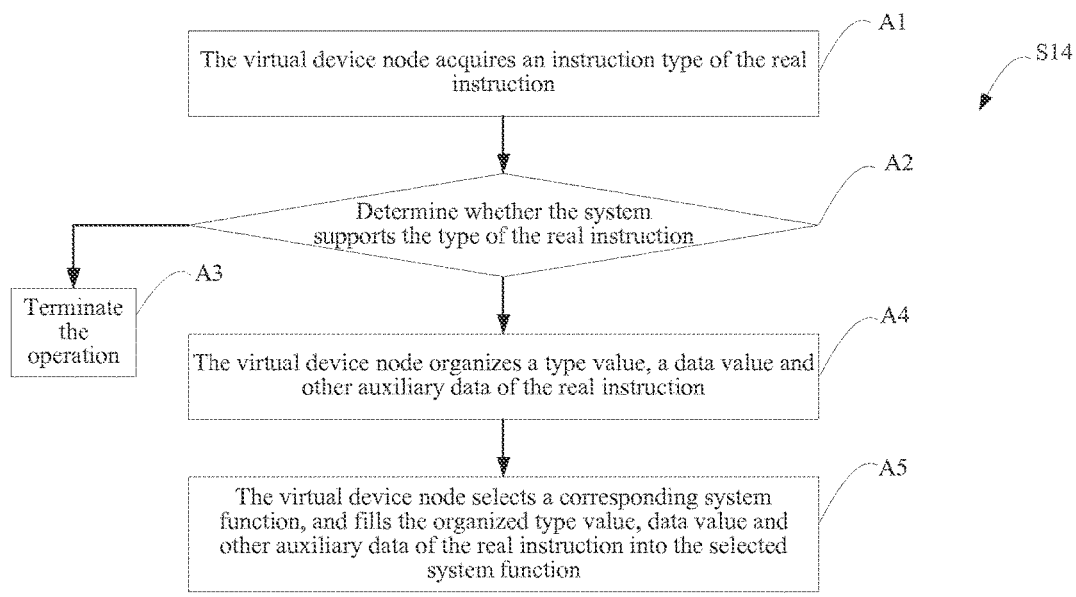
FIG. 2 is a flow chart of filling a corresponding system function by a virtual device node according to one embodiment of the present invention.

In one embodiment, the step that the virtual device node fills the real instruction into a corresponding system function automatically according to an instruction type specifically includes the following steps, as shown in FIG. 2:

At Step A1: the virtual device node acquires an instruction type of the real instruction.

At Step A2: whether the system supports the type of the real instruction is determined.

At Step A3: when the system does not support the type of the real instruction, the operation is terminated.

At Step A4: when the system supports the type of the real instruction, the virtual device node organizes a type value, a data value and other auxiliary data of the real instruction.

At Step A5: the virtual device node selects a corresponding system function, and fills the organized type value, data value and other auxiliary data of the real instruction into the selected system function.

At Step S15: a kernel space data injection event generated by filling the real instruction into the system function is responded.

The step of responding to the kernel space data injection event generated by filling the real instruction into the system function at Step S15 specifically includes: analyzing the filled real instruction by using the pre-stored key value mapping file, and making a response.

In this embodiment, after the virtual device node fills the type value, data value and other auxiliary data of the real instruction into the selected system function, a kernel space data injection event is generated, and finally the system responds to the event correctly through a bottom event key value mapping relationship.

According to the present invention, a virtual device node is established in a system of an electronic device, the virtual device node, serving as a bridge between an intelligent mobile device and the electronic product, is used for receiving virtual data being resolved by the system of the electronic product, and injecting a real instruction obtained by analyzing the virtual data into the system of the electronic product, so that the system of the electronic product can respond to the injected real instruction correctly. By means of the established virtual device node, the system of the electronic product can identify virtual data corresponding to different operation instructions of the same platform or virtual data corresponding to the same operation instruction of different platforms, where the virtual data is sent by the intelligent mobile device, thereby improving the compatibility and extensibility of the system. Therefore, the embodiment of the present invention can perfectly support non-contact control of the intelligent mobile device to the electronic product through a wireless connection, thereby providing desirable user experience.

Figure 3:
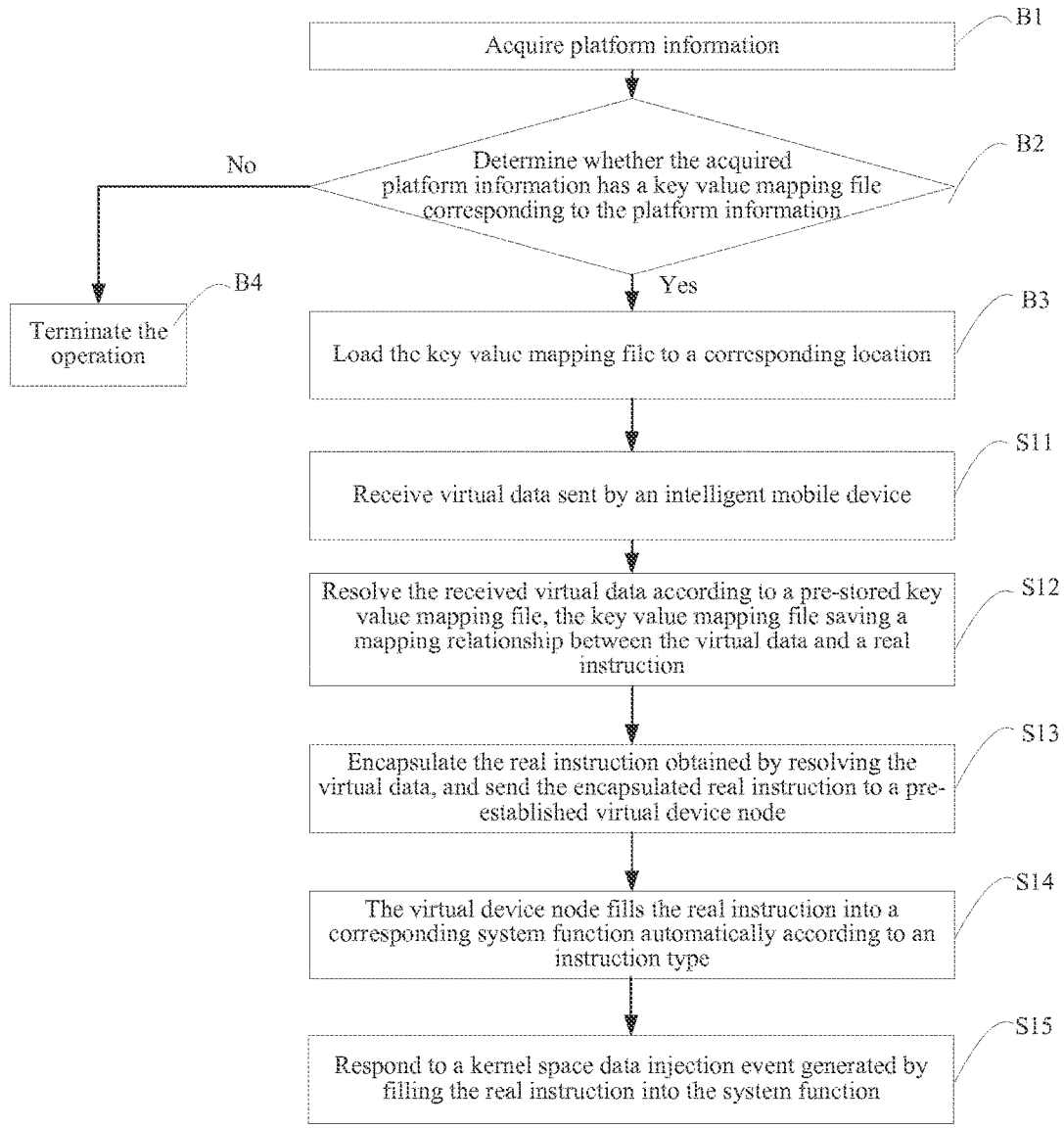
FIG. 3 is a flow chart of a data input supporting method according to another embodiment of the present invention.

FIG. 3 is a flow chart of a second data input supporting method provided in this embodiment. As a preferred embodiment, before the step of receiving the virtual data sent by the intelligent mobile device, the method further includes:

At Step B1: platform information is acquired.

At Step B2: whether the acquired platform information has a key value mapping file corresponding to the platform information is determined.

At Step B3: when the acquired platform information has the key value mapping file corresponding to the platform information, the key value mapping file is loaded to a corresponding location.

At Step B4: when the acquired platform information does not have the key value mapping file corresponding to the platform information, the operation is terminated.

In this embodiment, when the electronic product starts, the system of the electronic runs a program of acquire the platform information, and detects whether a key value mapping file corresponding to the platform exists according to the platform information, and if not, terminate the operation; if yes, load the corresponding key value mapping file to a corresponding location, so as to be prepared for correct response of the system. If the loading is unsuccessful, terminate the operation. By taking an android platform as an example, a key value mapping file thereof has a suffix of idc and kl, for example, Vendor_1918_Product_1918.idc and Vendor_1918_Product_0001.kl, which are respectively placed in /system/usr/idc and /system/usr/keylayout.

Figure 4:
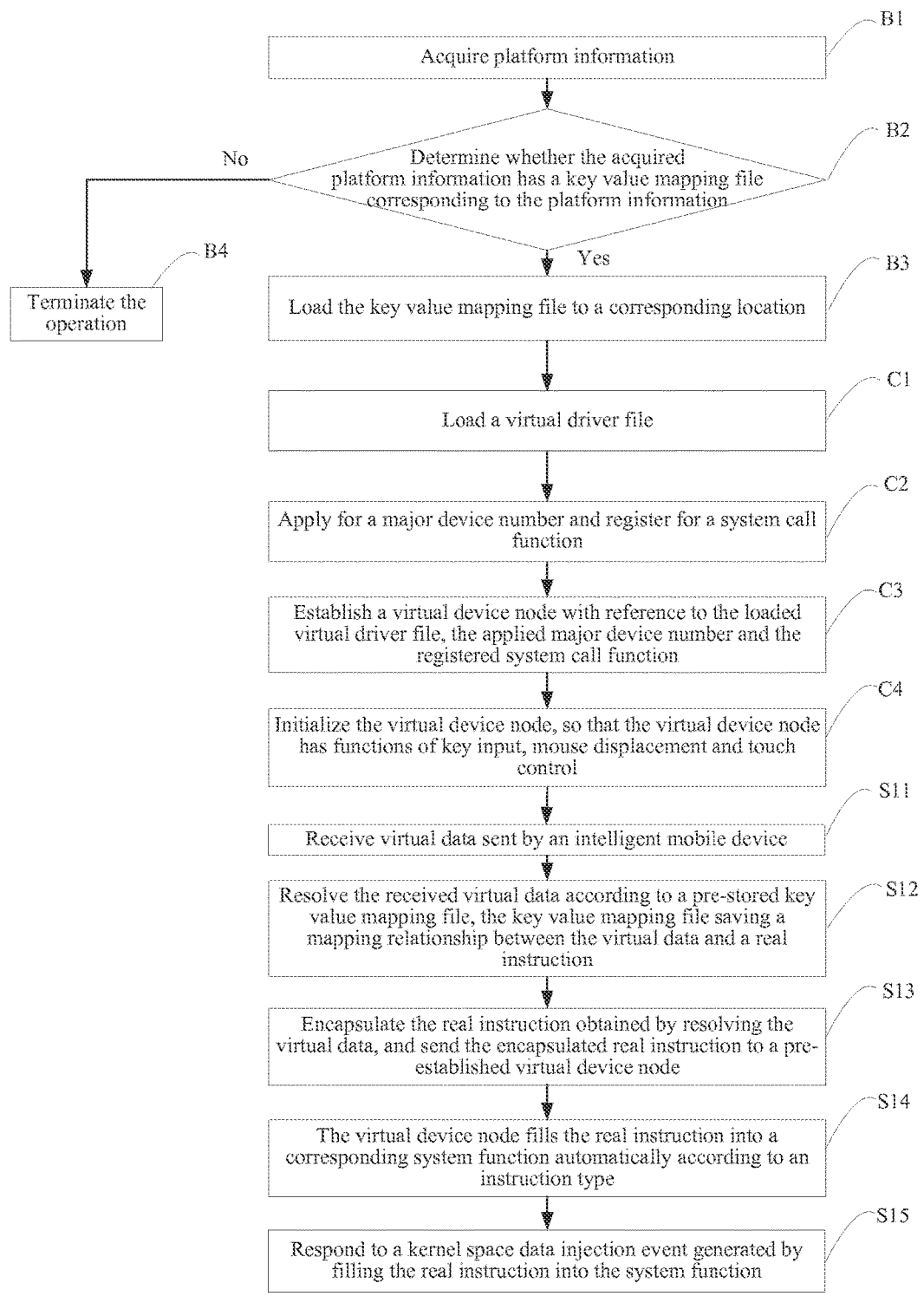
FIG. 4 is a flow chart of a data input supporting method according to yet another embodiment of the present invention.

FIG. 4 is a flow chart of a third data input supporting method provided in this embodiment. As a preferred embodiment, after the step of leading the key value mapping file to the corresponding location, the method further includes the following steps:

At Step C1: a virtual driver file is loaded.

At Step C2: a major device number is applied and a system call function is registered.

At Step C3: a virtual device node with reference to the loaded virtual driver file, the applied major device number and the registered system call function are established.

At Step C4: the virtual device node is initialized, so that the virtual device node has functions of key input, mouse displacement and touch control.

In this embodiment, after successfully loading the key value mapping file to the corresponding location, the system automatically loads a virtual driver file, after the virtual driver file is loaded, the system applies for a major device number for the virtual device node and registers for a system call function of the virtual device node, generates a virtual device node in a system directory (for example, /dev) after everything is ready, and initializes the virtual device node, so as to indicate the corresponding key value mapping file and register for functions of identifying events such as key input, mouse displacement and touch control.

Embodiment 2

In order to illustrate the procedure of the data input supporting method according to the embodiment of the present invention, the electronic product is specialized as a television, and the whole procedure is described by taking a user using an intelligent mobile device to simulate a key input to control up, down, left and right of a television interface as an example. It should be noted that other electronic devices can also be utilized to practice the present invention.

When the television starts, a platform information detection program is started, and platform information is acquired. For the purpose of illustration, an android system platform is taken herewith as an example, it is first checked to see whether a key value mapping file corresponding to the platform information exists. The key value mapping file in this example is a file with a suffix of idc and kl, for example, Vendor_1918_Product_1918.idc and Vendor_1918_Product_0001.kl.

1: Vendor_1918_Product_1918.idc defines orientation of an action event of a keyboard, a mouse, touch control and the like, where the keyboard input event is defined as follows:

```
keyboard.layout = Vendor_1918_Product_0001
keyboard.orientationAware = 1
```

2: Vendor_1918_Product_0001.kl is a specific mapping relationship, and the content thereof is defined as follows:

```
key 103    DPAD_UP       //upward
key 108    DPAD_DOWN     //downward
key 105    DPAD_LEFT     //leftward
key 106    DPAD_RIGHT    //rightward
```

If the two files exist, they are respectively placed in /system/usr/idc and /system/usr/keylayout. If successful, the driver is entered to load the virtual device node establishment module.

The system loads the virtual device driver file, applies for a major device number and registers for a system call function for a to-be-established virtual device node, generates a virtual device node in a system directory /dev, and then initialize the virtual device node, so that the virtual device node indicates to the system the corresponding key value mapping file thereof and registers for functions of identifying events such as key input, mouse displacement and touch control, which are described as follows.

1: Indicate that the key value mapping file corresponding to the virtual device node is Vendor_1918_Product_1918.idc:

```
vkeyboard_idev->id.vendor = 0x1918;
vkeyboard_idev->id.product = 0x1918;
```

2: Enable the virtual device node to have a function of identifying a key input event:
  _set_bit(EV_KEY, vkeyboard_idev->evbit);

3: Enable the virtual device node to have a function of identifying a mouse relative displacement event:

```
___set_bit(EV_REL, vkeyboard_idev->evbit);
___set_bit(REL_X, vkeyboard_idev->relbit);
___set_bit(REL_Y, vkeyboard_idev->relbit);
```

4: Enable the virtual device node to have a function of identifying a multi-point touch event:

```
___set_bit(EV_ABS, vtouch_idev->evbit);
___set_bit(ABS_MT_POSITION_X, vtouch_idev->absbit);
___set_bit(ABS_MT_POSITION_Y, vtouch_idev->absbit);
___set_bit(ABS_MT_TOUCH_MAJOR, vtouch_idev->absbit);
``` then, the virtual device node enters a state of waiting for data injection.

A mobile terminal searches to find a television device through a local area network, establishes a connection with the television device, enters an operation interface of the television device, and clicks a button, for example, clicks a "left" command button; after the button is clicked, corresponding protocol data is sent to the television terminal, and the television terminal checks to see whether a corresponding instruction exists according to a analyzing rule, and if the corresponding instruction exists, the television device encapsulates instruction data, and sends the instruction data to the virtual device node in an ioctl manner, which is described as follows:

```
sendEvent(fd, EV_KEY, code, 1);
    usleep(50000);
    sendEvent(fd, EV_KEY, code, 0);
sendEvent(int fd, int type, int code, int value)
{
struct input_event event;
event.type = type;
event.code = code;
event.value = value;
gettimeofday(&event.time,0);
write(fd,&event,sizeof(event));
}
``` where, the type being EV_KEY indicates key input, the code has a value of 0x69 after being resolved, indicating leftward, and the value being 1 indicates pressed and the value being 0 indicates bounced.

The virtual device node, after receiving the instruction data, determines a type of the instruction data, and checks whether the instruction type, being a key input type here, is supported; if yes, the virtual device node organizes other data required by the instruction data, selects a corresponding system function, and injects the instruction data into the system, as shown in the following:

input_report_key(vkeyboard_idev, event.code, event.value);

After receiving an instruction value 0x69, the system, according to the previous mapping relationship, configures key 105 DPAD_LEFT //leftward, so as to identify the instruction correctly and make a response, thereby implementing the support on the non-contact control of the intelligent mobile device terminal to the television through the wireless connection.

The procedures of simulating events such as mouse displacement, key, touch screen single-point and multi-point control are consistent of the procedure of simulating the keyboard input, and are not repeated herein.

Embodiment 3

Figure 5:
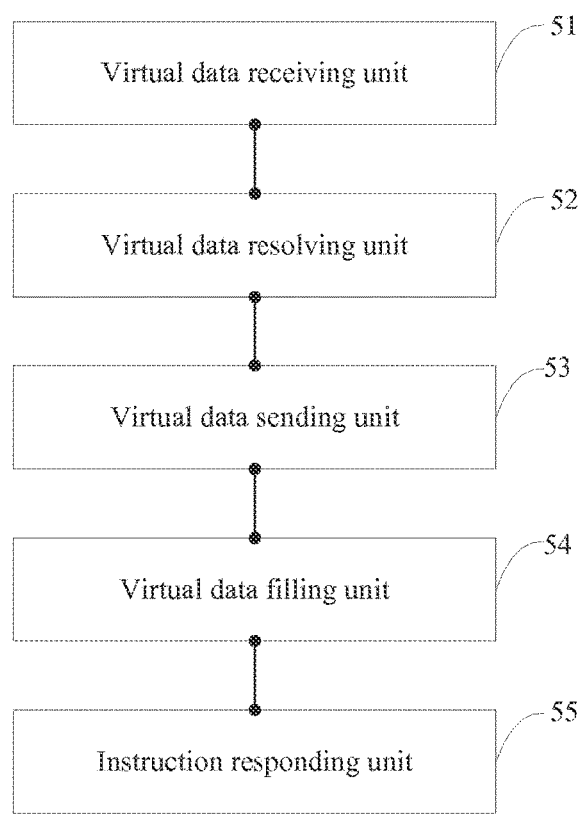
FIG. 5 shows schematically a structural block of a data input supporting apparatus according to one embodiment of the present invention.

FIG. 5 shows schematically a structural block of a data input supporting apparatus according to Embodiment 3 of the present invention. For the purpose of illustration, only parts related to the embodiment of the present invention are shown.

The data input supporting apparatus may be applied to various information processing terminals, such as a television and a set top box, that is connected to a server in a wired or wireless connection, may be a software unit, a hardware unit or a unit in combination of software and hardware that runs in the terminal, and may also be integrated in the terminal as an independent mounting member or run in an application system of the terminal.

A virtual data receiving unit 51 is used for receiving virtual data sent by an intelligent mobile device.

In this embodiment, after an electronic product establishes connection with an intelligent mobile device, the virtual data receiving unit 51 of the electronic product receives the virtual data sent by the intelligent mobile device.

A virtual data analyzing unit 52 is used for analyzing the received virtual data according to a pre-stored key value mapping file, the key value mapping file saving a mapping relationship between the virtual data and a real instruction.

A virtual data sending unit 53 is used for encapsulating the real instruction obtained by analyzing the virtual data, and sending the encapsulated real instruction to a pre-established virtual device node.

In this embodiment, the manner of sending to the pre-established virtual device node is an ioctl manner.

A virtual data filling unit 54 is used for filling the real instruction into a corresponding system function automatically according to an instruction type.

The virtual data filling unit 54 includes an instruction type acquisition module adapted for acquiring an instruction type of the real instruction; and an instruction data filling module adapted for determining whether the system supports the type of the real instruction, and when the system supports the type of the real instruction, organizing a type value and a data value of the real instruction, and filling the organized type value and data value of the real instruction into the selected system function.

In this embodiment, when the system does not support the type of the real instruction, terminate the operation.

An instruction responding unit 55 is used for responding to a kernel space data injection event generated by filling the real instruction into the system function.

As a preferred embodiment, the instruction responding unit 55 resolves the filled real instruction by using the pre-stored key value mapping file, and makes a response.

In the embodiment of the present invention, by means of the established virtual device node, the system of the electronic product can identify virtual data corresponding to different operation instructions of the same platform or virtual data corresponding to the same operation instruction of different platforms, where the virtual data is sent by the intelligent mobile device, thereby improving the compatibility and extensibility of the system. Therefore, the embodiment of the present invention can perfectly support non-contact control of the intelligent mobile device to the electronic product through a wireless connection, thereby providing desirable user experience.

Embodiment 4

Figure 6:
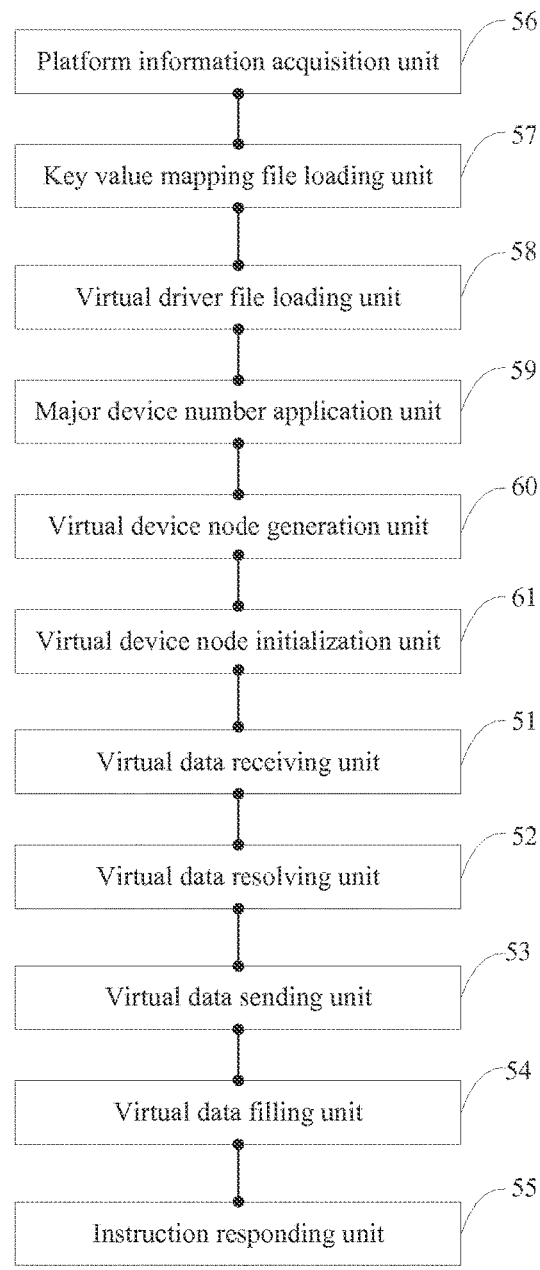
FIG. 6 shows schematically a structural block of a data input supporting apparatus according to another embodiment of the present invention.

FIG. 6 shows schematically a structural block of another data input supporting apparatus according to Embodiment 4 of the present invention, where the virtual data receiving unit 51, the virtual data analyzing unit 52, the virtual data sending unit 53, the virtual data filling unit 54 and the instruction responding unit 55 are the same as those in Embodiment 3, and are not repeated herein.

In this embodiment shown in FIG. 6, the data input supporting apparatus includes a platform information acquisition unit 56 adapted for acquiring platform information; and a key value mapping file loading unit 57 adapted for determining whether the acquired platform information has a key value mapping file corresponding to the platform information, and when the acquired platform information has the key value mapping file corresponding to the platform information, loading the key value mapping file to a corresponding location.

In this embodiment, when the platform information does not have the key value mapping file corresponding to the platform information, terminate the operation.

As a preferred embodiment, the apparatus includes a virtual driver file loading unit 58 adapted for loading a virtual driver file, a major device number application unit 59 adapted for applying for a major device number and registering for a system call function, a virtual device node generation unit 60 adapted for establishing a virtual device node with reference to the loaded virtual driver file, the applied major device number and the registered system call function; and a virtual device node initialization unit 61 adapted for initializing the virtual device node, so that the virtual device node has functions of key input, mouse displacement and touch control.

In the embodiment of the present invention, a virtual device node is established in a system of an electronic device, the virtual device node, serving as a bridge between an intelligent mobile device and the electronic product, is used for receiving virtual data being resolved by the system of the electronic product, and injecting a real instruction obtained by analyzing the virtual data into the system of the electronic product, so that the system of the electronic product can respond to the injected real instruction correctly. By means of the established virtual device node, the system of the electronic product can identify virtual data corresponding to different operation instructions of the same platform or virtual data corresponding to the same operation instruction of different platforms, where the virtual data is sent by the intelligent mobile device, thereby improving the compatibility and extensibility of the system. Therefore, the embodiment of the present invention can perfectly support non-contact control of the intelligent mobile device to the electronic product through a wireless connection, thereby providing desirable user experience.

The methods described above may be implemented by one or more computer programs executed by one or more processors. One aspect of the present invention provides a non-transitory tangible computer-readable medium storing instructions which, when executed by the one or more processors, cause the above disclosed apparatus to perform the above-disclosed data input supporting method. The computer programs may also include stored data. Non-limiting examples of the non-transitory tangible computer readable medium are nonvolatile memory, magnetic storage, and optical storage. The storage medium may include, for example, CD/DVD, Read-Only Memory or ROM, and Random Access Memory or RAM, a magnetic disk, an optical disk, flash dive, or the likes.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A data input supporting method for controlling an electronic device by an intelligent mobile device, comprising the steps of:
   establishing, by the intelligent mobile device, a connection with the electronic device, and sending, by the intelligent mobile device, virtual data of a control instruction to the electronic device;
   receiving, by the electronic device, the virtual data sent by the intelligent mobile device;
   analyzing, by the electronic device, the received virtual data according to a pre-stored key value mapping file in the electronic device, the pre-stored key value mapping file saving a mapping relationship between the virtual data and a real instruction;
   encapsulating, by the electronic device, the real instruction obtained by the step of analyzing the virtual data, and sending, by the electronic device, the encapsulated real instruction to a pre-established virtual device node in the electronic device;
   filling the real instruction into a corresponding system function by the pre-established virtual device node in the electronic device automatically according to an instruction type; and
   responding to a kernel space data injection event generated by the step of filling the real instruction into the corresponding system function,
   wherein the step of filling the real instruction into the corresponding system function by the pre-established virtual device node in the electronic device automatically according to the instruction type comprises the steps of:
   acquiring the instruction type of the real instruction; and
   determining whether a system supports the instruction type of the real instruction, and when the system supports the instruction type of the real instruction, organizing a type value and a data value of the real instruction, and filling the organized type value and data value of the real instruction into the corresponding system function.

2. The method according to claim 1, prior to the step of receiving, by the electronic device, the virtual data sent by the intelligent mobile device, further comprising the steps of:
   acquiring platform information of the intelligent mobile device; and
   determining, by the electronic device, whether the acquired platform information has the pre-stored key value mapping file corresponding to the platform information, and when the acquired platform information has the pre-stored key value mapping file corresponding to the platform information, loading, by the electronic device, the pre-stored key value mapping file corresponding to the platform information to a corresponding location in the electronic device.

3. The method according to claim 2, after the step of loading, by the electronic device, the pre-stored key value mapping file corresponding to the platform information to the corresponding location in the electronic device, further comprising the steps of:
   loading a virtual driver file;
   applying for a major device number and registering for a system call function;
   establishing the pre-established virtual device node with reference to the loaded virtual driver file, the applied major device number and the registered system call function; and
   initializing the pre-established virtual device node, so that the pre-established virtual device node has functions of key input, mouse displacement and touch control.

4. The method according to claim 1, wherein the step of responding to the kernel space data injection event generated by the step of filling the real instruction into the corresponding system function comprises the step of:
   analyzing the filled real instruction by using the pre-stored key value mapping file in the electronic device, and making a response.

5. A data input supporting apparatus for controlling an electronic device by an intelligent mobile device, comprising:
   one or more processors; and
   a memory storing computer-executable codes executable at the one or more processors, wherein the codes comprise:
   a virtual data receiving unit, adapted for receiving virtual data sent by the intelligent mobile device;
   a virtual data analyzing unit, adapted for analyzing the received virtual data according to a pre-stored key value mapping file in the electronic device, the pre-stored key value mapping file saving a mapping relationship between the virtual data and a real instruction;
   a virtual data sending unit, adapted for encapsulating the real instruction obtained by the analyzing the received virtual data, and sending the encapsulated real instruction to a pre-established virtual device node in the electronic device;

a virtual data filling unit, adapted for filling the real instruction into a corresponding system function automatically according to an instruction type; and
an instruction responding unit, adapted for responding to a kernel space data injection event generated by the filling the real instruction into the corresponding system function,
wherein the virtual data filling unit comprises:
an instruction type acquisition module, adapted for acquiring the instruction type of the real instruction; and
an instruction data filling module, adapted for determining whether a system supports the instruction type of the real instruction, and when the system supports the instruction type of the real instruction, organizing a type value and a data value of the real instruction, and filling the organized type value and data value of the real instruction into the corresponding system function.

6. The apparatus according to claim 5, the codes further comprising:
a platform information acquisition unit, adapted for acquiring platform information of the intelligent mobile device; and
a key value mapping file loading unit, adapted for determining whether the acquired platform information has the pre-stored key value mapping file corresponding to the platform information, and when the acquired platform information has the pre-stored key value mapping file corresponding to the platform information, loading the pre-stored key value mapping file corresponding to the platform information to a corresponding location in the electronic device.

7. The apparatus according to claim 6, the codes further comprising:
a virtual driver file loading unit, adapted for loading a virtual driver file;
a major device number application unit, adapted for applying for a major device number and registering for a system call function;
a virtual device node generation unit, adapted for establishing the pre-established virtual device node with reference to the loaded virtual driver file, the applied major device number and the registered system call function; and
a virtual device node initialization unit, adapted for initializing the pre-established virtual device node, so that the pre-established virtual device node has functions of key input, mouse displacement and touch control.

8. The apparatus according to claim 5, wherein, the instruction responding unit resolves the filled real instruction by using the pre-stored key value mapping file in the electronic device, and makes a response.

9. A non-transitory tangible computer-readable medium storing codes which, when executed by one or more processors, cause an apparatus to perform a data input supporting method for controlling an electronic device by an intelligent mobile device, the method comprising the steps of:
receiving virtual data sent by the intelligent mobile device;
analyzing the received virtual data according to a pre-stored key value mapping file in the electronic device, the pre-stored key value mapping file saving a mapping relationship between the virtual data and a real instruction;
encapsulating the real instruction obtained by the step of analyzing the virtual data, and sending the encapsulated real instruction to a pre-established virtual device node in the electronic device;
filling the real instruction into a corresponding system function by the pre-established virtual device node in the electronic device automatically according to an instruction type; and
responding to a kernel space data injection event generated by filling the real instruction into the corresponding system function,
wherein the step of filling the real instruction into the corresponding system function by the pre-established virtual device node in the electronic device automatically according to the instruction type comprises the steps of:
acquiring the instruction type of the real instruction; and
determining whether a system supports the instruction type of the real instruction, and when the system supports the instruction type of the real instruction, organizing a type value and a data value of the real instruction, and filling the organized type value and data value of the real instruction into the corresponding system function.

10. The non-transitory tangible computer-readable medium according to claim 9, wherein the method, prior to the step of receiving the virtual data sent by the intelligent mobile device, further comprises the steps of:
acquiring platform information of the intelligent mobile device; and
determining whether the acquired platform information has the pre-stored key value mapping file corresponding to the platform information, and when the acquired platform information has the pre-stored key value mapping file corresponding to the platform information, loading the pre-stored key value mapping file corresponding to the platform information to a corresponding location in the electronic device.

11. The non-transitory tangible computer-readable medium according to claim 10, wherein the method, after the step of loading the pre-stored key value mapping file corresponding to the platform information to the corresponding location in the electronic device, further comprises the steps of:
loading a virtual driver file;
applying for a major device number and registering for a system call function;
establishing the pre-established virtual device node with reference to the loaded virtual driver file, the applied major device number and the registered system call function; and
initializing the pre-established virtual device node, so that the pre-established virtual device node has functions of key input, mouse displacement and touch control.

12. The non-transitory tangible computer-readable medium according to claim 9, wherein the step of responding to the kernel space data injection event generated by the step of filling the real instruction into the corresponding system function comprises the step of:
analyzing the filled real instruction by using the pre-stored key value mapping file in the electronic device, and making a response.

* * * * *